US005887887A

United States Patent [19]

Keuning

[11] Patent Number: 5,887,887

[45] Date of Patent: Mar. 30, 1999

[54] WALKING CARRIAGE

[75] Inventor: Ronald Keuning, Driebergen, Netherlands

[73] Assignee: Premis Medical B.V., Netherlands

[21] Appl. No.: 609,647

[22] Filed: Mar. 1, 1996

[30] Foreign Application Priority Data

Mar. 3, 1995 [NL] Netherlands .......................... 95.00423

[51] Int. Cl.$^6$ ........................................................ B62B 3/02

[52] U.S. Cl. ........................ 280/641; 280/642; 280/47.38

[58] Field of Search .................................... 280/641, 642, 280/651, 643, 47.25, 47.35, 47.38; 297/5, 6, 194; 29/434

[56] References Cited

U.S. PATENT DOCUMENTS

| | | | |
|---|---|---|---|
| 2,685,325 | 8/1954 | Webster | 297/30 |
| 3,778,866 | 12/1973 | Nakanishi . | |
| 4,211,309 | 7/1980 | Ruggiero . | |
| 5,261,682 | 11/1993 | Chuang . | |
| 5,348,336 | 9/1994 | Fernie et al. | 280/641 |
| 5,409,028 | 4/1995 | Lee | 135/66 |
| 5,603,517 | 2/1997 | Lorman | 280/5.2 |
| 5,647,602 | 7/1997 | Nevin | 280/87.021 |
| 5,716,063 | 2/1998 | Doyle et al. | 280/87.05 |

FOREIGN PATENT DOCUMENTS

| | | | |
|---|---|---|---|
| 2449100 | 2/1994 | Benelux TM/Des. Off. . | |
| 0007708 | 2/1980 | European Pat. Off. . | |
| 9005744 | 9/1990 | Germany . | |
| 9303081 U | 3/1993 | Germany . | |
| 9303081 | 6/1993 | Germany . | |
| 0128762 | 6/1991 | Japan | 280/643 |

*Primary Examiner*—J. J. Swann
*Assistant Examiner*—Bridget Avery
*Attorney, Agent, or Firm*—Ostrolenk, Faber, Gerb & Soffen, LLP

[57] ABSTRACT

A walking carriage or ambulatory aid having a frame that supports front wheels and a collapsing rear support for rear wheels. A seat supported to the push rods of the frame has a grip at its rear. The seat is connected with the support for the rear wheels so that when the rear of the seat is lifted, the rear wheels are pivoted toward the front wheels to collapse the carriage. A tray is pivoted to the frame between a first pivot position above the seat and a second position below the seat and over an article carrier supported on the frame.

16 Claims, 6 Drawing Sheets

WALKING CARRIAGE

BACKGROUND OF THE INVENTION

A walking carriage, also known as a "rollator", is used both outdoors and indoors as ambulatory aid by people such as an the elderly who have difficulty walking. Existing rollators are often provided with a seat on which the user can rest from time to time and braking means for braking and with locking these brakes when standing still. In addition, known rollators are usually provided with collapsing means for folding up the rollator, for instance into the trunk of an automobile. When such a rollator is not in use it can also be placed in collapsed state at a location in a home where it occupies as little space as possible. The known rollator usually has the drawback that collapsing thereof is awkward, for instance because the rollator falls over during folding, whereby the user can also lose his balance and be injured if he falls.

Such a known rollator is described for instance in the German Gebrauchsmuster G 90 05 744.9. This known walking carriage comprises:

- a frame having one or more push bars for pushing along the walking carriage;
- a pair of front wheels and a pair of rear wheels for causing travel of the walking carriage when it is pushed along, which wheels are arranged rotatably and/or pivotally on downward extending tubes of the frame;
- collapsing means for collapsing or folding up the frame between a first position of use wherein the front and rear wheels are situated at relatively large mutual distance and wherein the walking carriage can be pushed along and a second collapsed position wherein the front and rear wheels are situated relatively closely to each other; and
- a seat part which is arranged pivotally on the frame and which in said position of use extends in substantially lying position at a level lower than the outer ends of the push bars.

The height of this known walking carriage can be easily adapted to the height of the user.

This known walking carriage has the drawback however that for collapsing thereof the user must lean forward or bend over, which may represent a problem for many users.

SUMMARY OF THE INVENTION

The present invention has for its object to provide a walking carriage which obviates the above stated drawback and which is easily collapsible by the user.

This object is achieved in that the seat part is provided with a hand-grip and that the seat part is operatively coupled to the collapsing means such that when the hand-grip is engaged and the seat part is pivoted upward the walking carriage is carried by the collapsing means into fully or partially collapsed position.

The present invention therefore prevents the user having to bend down when collapsing the walking carriage.

The collapsing means are preferably embodied such that in the first instance the walking carriage is collapsed into an intermediate position which is usually sufficient to stow away the walking carriage temporarily indoors. If the walking carriage must be transported for instance in the back of an automobile, the carriage can be collapsed further into a fully collapsed position in which it takes up little space.

It is noted that an ambulatory aid is per se known from the American patent specification U.S. Pat. No. 5,261,682, in particular for rehabilitation purposes in a hospital environment. While this rehabilitation aid is collapsible into an intermediate position, it is otherwise a completely different ambulatory aid and lacks for instance a pair of front wheels and a pair of rear wheels arranged on downward extending tubes of the frame as well as the seat part.

The rollator according to the present invention is further preferably provided with carrying means and a pivotable tray plate member which in downward pivoted position closes the carrying means. This makes it less easy for a bag-snatcher to steal bags from the carrying means.

In addition the walking carriage according to the present invention is preferably provided with brake cables fed through or directly against the frame in order to prevent a cable catching on an obstacle during travel with the walking carriage, whereby accidents could occur.

In existing walking carriages use is often made or a braking member which engages on a wheel which is usually provided for that purpose with a solid rubber tyre, wherein such a solid rubber tyre preferably has roughly the same height as a pneumatic tyre and is manufactured from solid polyurethane, so that this solid rubber tyre achieves a roughly equivalent level of comfort for the user. With the use of pneumatic tyres and a braking member which engages on a pneumatic tyre, the pneumatic tyres have to be replaced after a comparatively short time because of the wear that occurs. Thinner solid tyres can likewise be susceptible to wear and/or adversely affect the level of comfort.

The walking carriage according to the present invention is preferably provided with a drum brake so that it can be provided with pneumatic tyres which are less expensive and which have the effect of increasing comfort. The drum brake is preferably manufactured as far as possible from plastic components in order to further decrease the weight of the walking carriage.

Further advantages, features and details of the present invention will be elucidated on the basis of the following description with reference to the annexed drawings.

DESCRIPTION OF THE PREFERRED EMBODIMENTS

Figure 1:
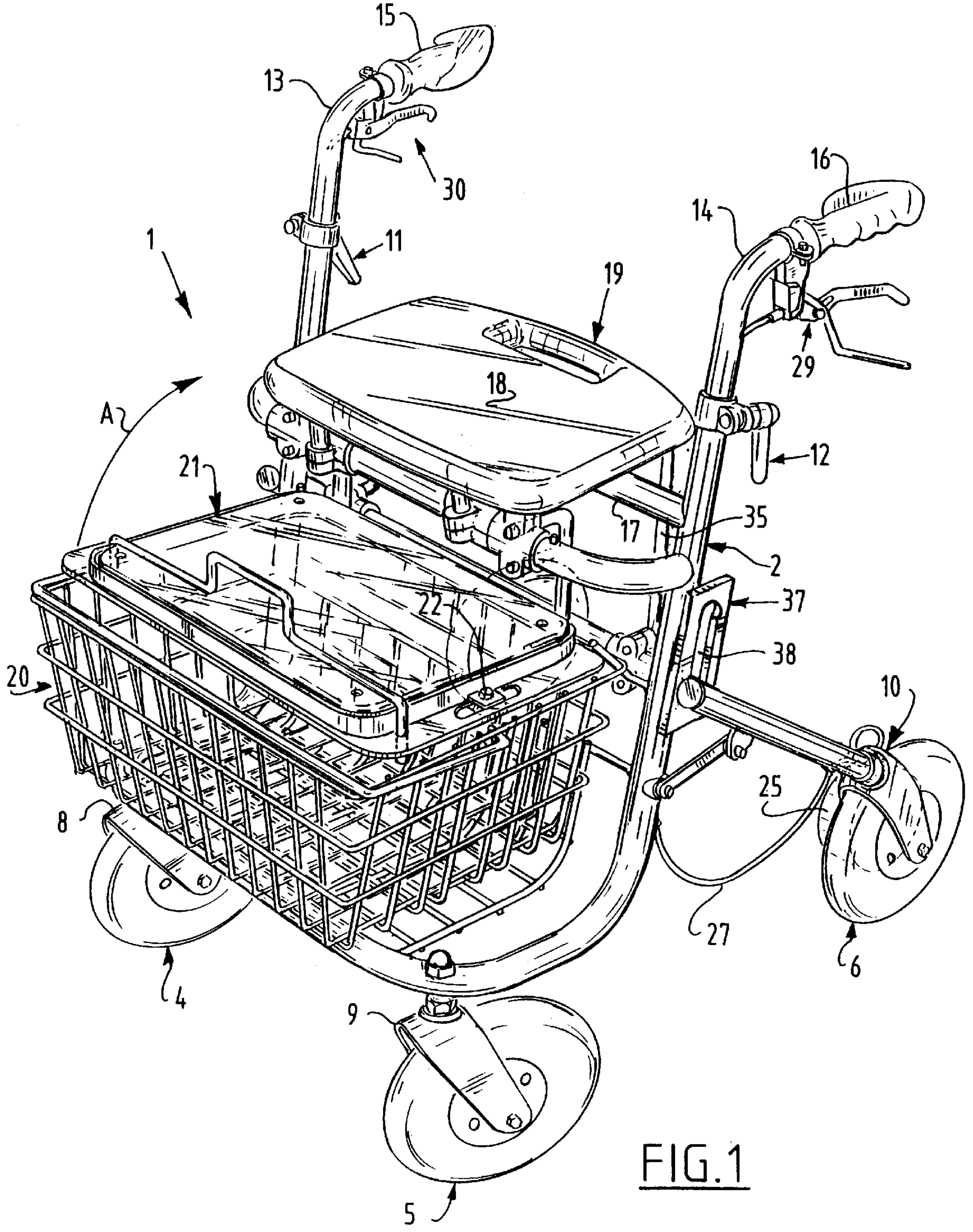
FIG. 1 shows a view in perspective of a preferred embodiment according to the present invention.

A preferred embodiment of a walking carriage 1 (FIGS. 1, 2, 3, 4 and 5) comprises a frame 2 of metal tubes to which wheels 3, 4, 5 and 6 are preferably suspended for rotation and pivoting in forks 7, 8, 9 and 10. The forks 7–10 are preferably manufactured from a strong plastic. Frame 2 is provided on the upper part with bent push bars 13 and 14 which are height-adjustable using adjusting members 11 and 12 and which are provided with handles 15 and 16 for gripping by the user of the walking carriage. On a cross bar 17 of frame 2 rests a seat 18 on which the user of the walking carriage can take up position, for instance to rest. The seat 18 is preferably further provided with a hand-grip 19 which can be easily gripped by the user to fold up the walking carriage 1, as will be further described hereinbelow.

Figure 2:
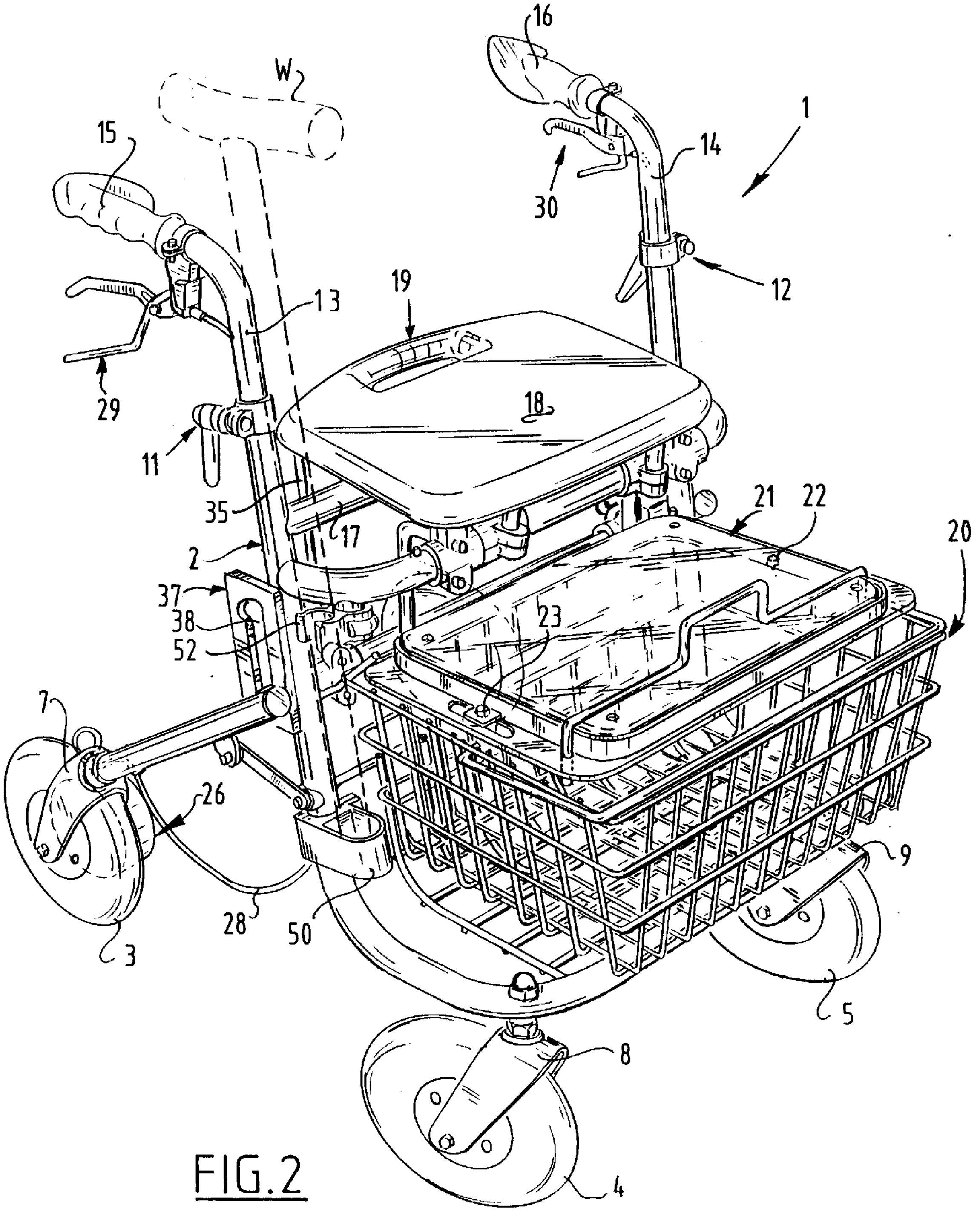
FIG. 2 shows a view in perspective of the walking carriage of FIG. 1 as seen from another angle.

Preferably also arranged on frame 2 is a luggage carrier 20 in the form of a basket of metal wires which, in the position shown in FIGS. 1 and 2, is partially closed by a tray plate 21 which can De pivoted upward in the direction of arrow A (FIG. 1). Tray plate 21 is preferably manufactured from a transparent plastic. In the upward pivoted position (see FIG. 3) the tray plate 21 rests on the seat 18 and a cup of tea or the like can be placed thereon. The tray plate is easily removable using screw members 22 and 23 rotatable for instance through a half turn.

Arranged close to one of the wheels, preferably both rear wheels 6 and 7, are drum brakes 25 respectively 26 which are preferably constructed entirely or for the greater part of plastic components. In order to obtain a sufficient braking action the brake shoes are preferably manufactured from a wear-resistant plastic. To further increase the braking action a rough plastic belt, which is not visible in the figures, is preferably accommodated between the brake shoes and the brake drum. Using brake cables 27 respectively 28 which, as can be seen in FIGS. 1 and 2, are preferably guided partially through the interior or a frame part, the drum brakes 25 and 26 are connected to brake operating means 29 respectively 30 which extend close to the handles 15 and 16 respectively. It is also possible to attach to a frame part a separate guide for guiding the brake cable.

Figure 3:
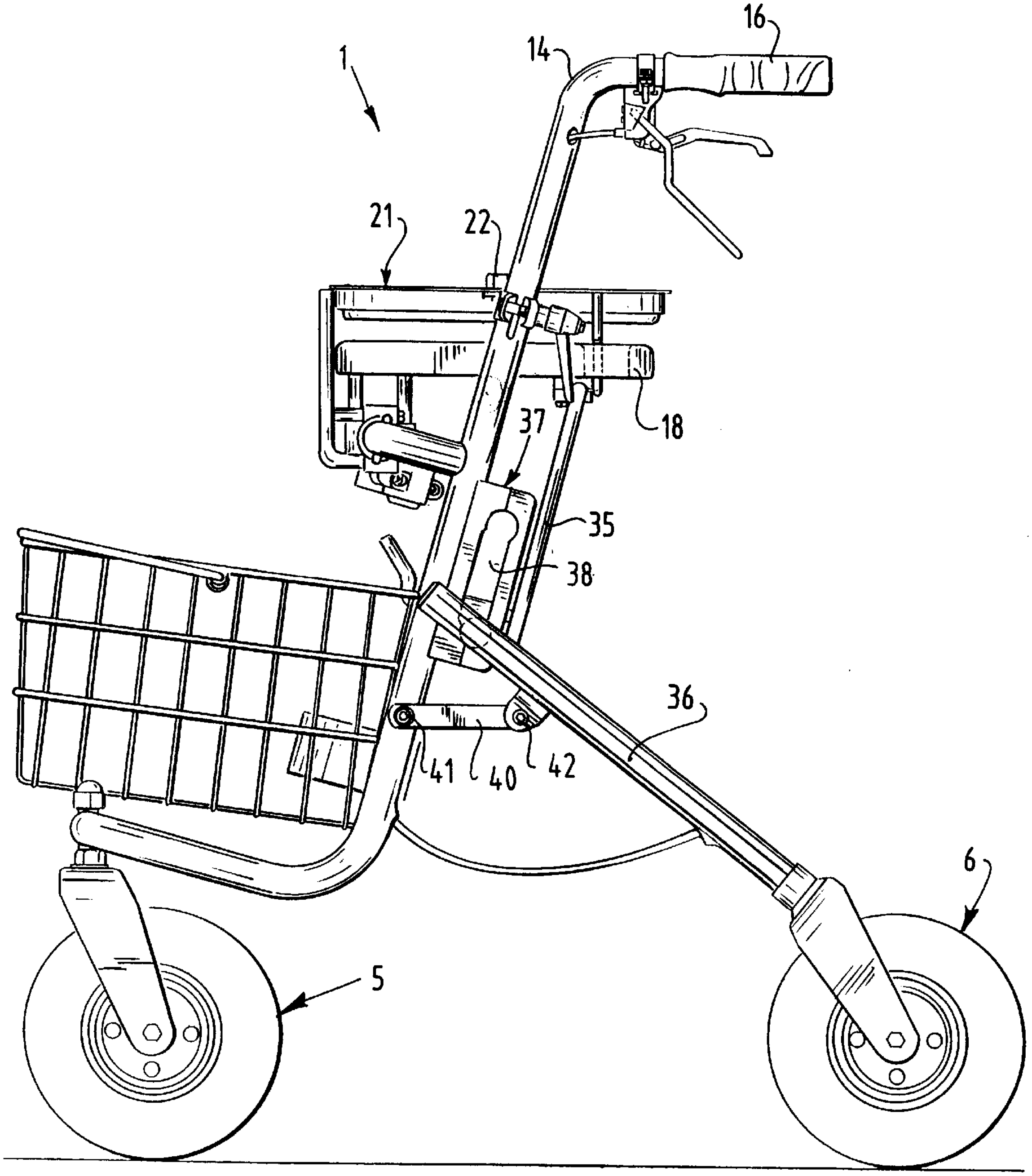
FIG. 3 is a side view of the walking carriage shown in FIGS. 1 and 2 in a first folded-open position.
Figure 4:
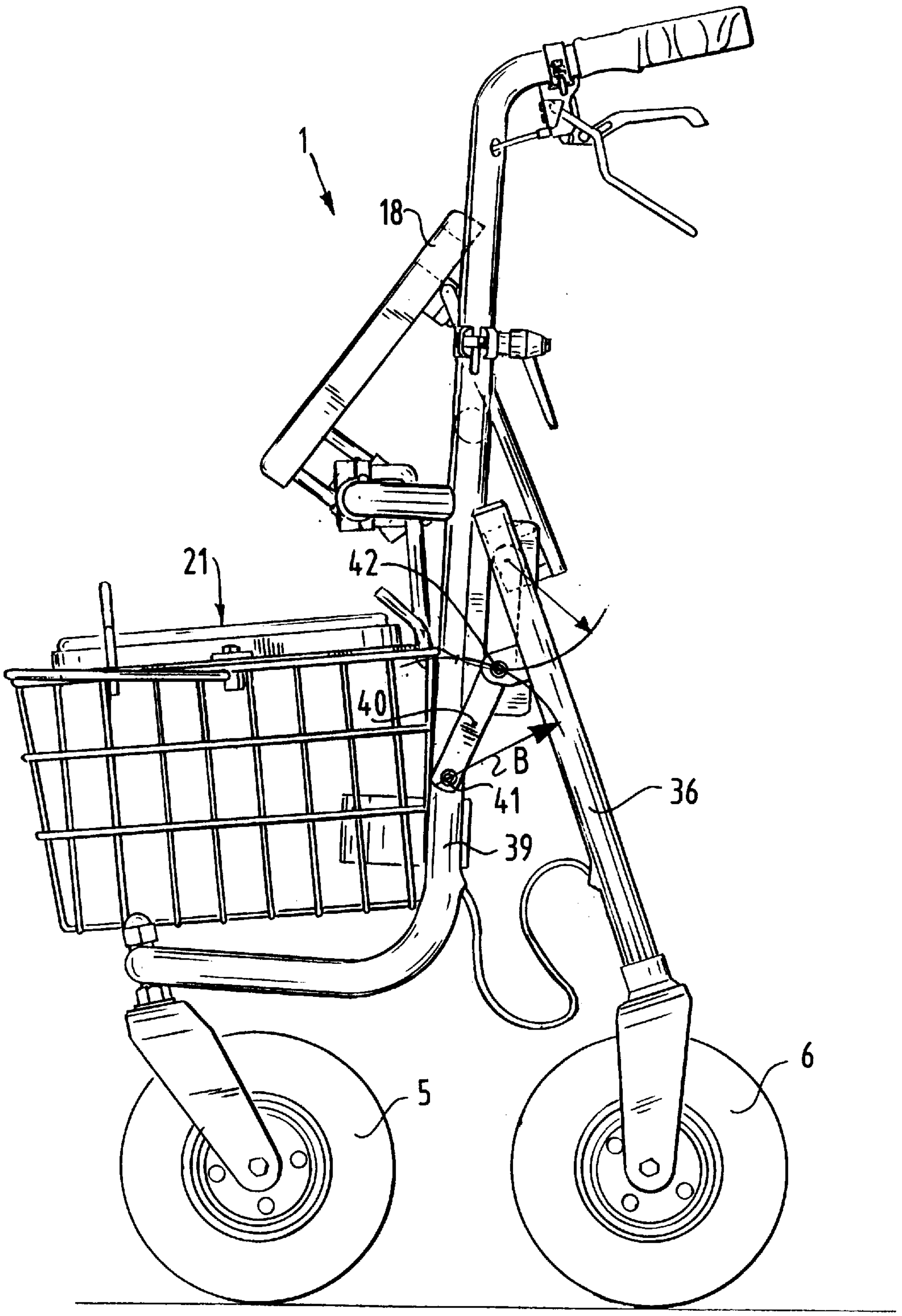
FIG. 4 is a side view of the walking carriage shown in FIGS. 1, 2 and 3 in a second intermediate position.
Figure 5:
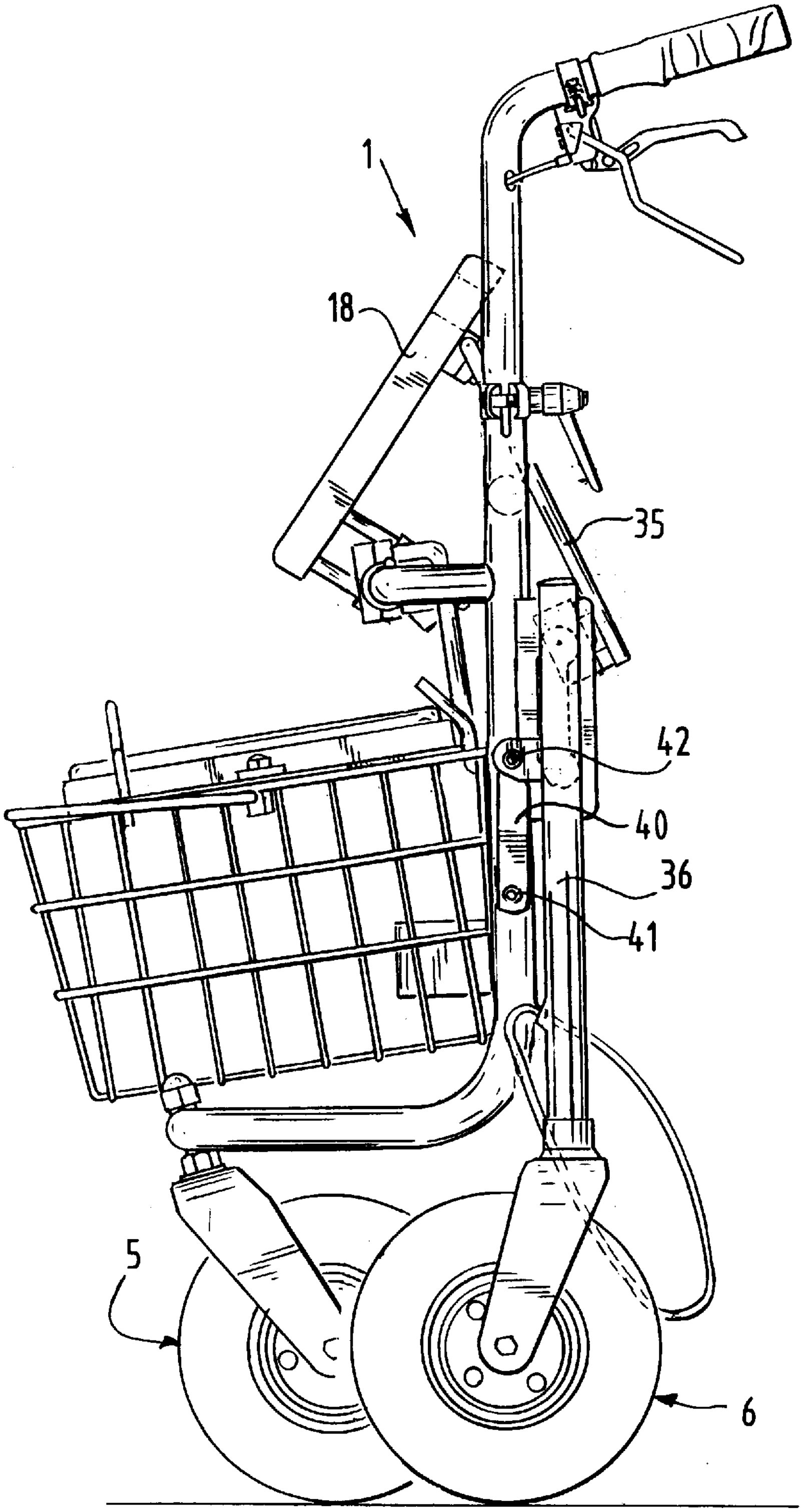
FIG. 5 is a side view of the walking carriage shown in FIGS. 1, 2, 3 and 4 in a fully collapsed position.

When the walking carriage 1 is folded up (FIGS. 3, 4 and 5) the tray plate 21 is first pivoted downward from the position shown in FIG. 3 to the position shown in FIG. 4. The seat 18 is then gripped by the hand-grip 19 and moved upward, wherein, because the seat 18 is connected via frame bars 35 on both sides via a shaft end to frame bars 36, the rear wheels 6 and 3 are moved toward the front wheels, wherein the extreme positions of this movement are defined by guide members 37 which are arranged on the frame and in which a recess 38 is arranged such that the transverse shaft ends snap into the guide members in both extreme positions shown in FIGS. 3 and 4.

In the intermediate position shown in FIG. 4 it is still possible for the user to receive some support from the walking carriage, as it will not yet fall over of itself. The user then has ample time to move frame bars 36 and 39 in the direction of arrow B until the walking carriage 1 assumes the position shown in FIG. 5, wherein it occupies little space and can thus be laid easily into for instance the trunk of an automobile or placed in a corner or a room in a home. Preferably arranged between frame bars 36 and 39 is an arm 40 which can pivot on both sides on hinge pins 41 on frame part 39 and on hinge pins 42 on frame part 36.

Further shown in FIG. 2 is that the walking carriage according to the present invention is preferably provided with a holder 50 and a clip 52 arranged thereabove on the frame for receiving a walking stick W as designated in broken lines.

Figure 6:
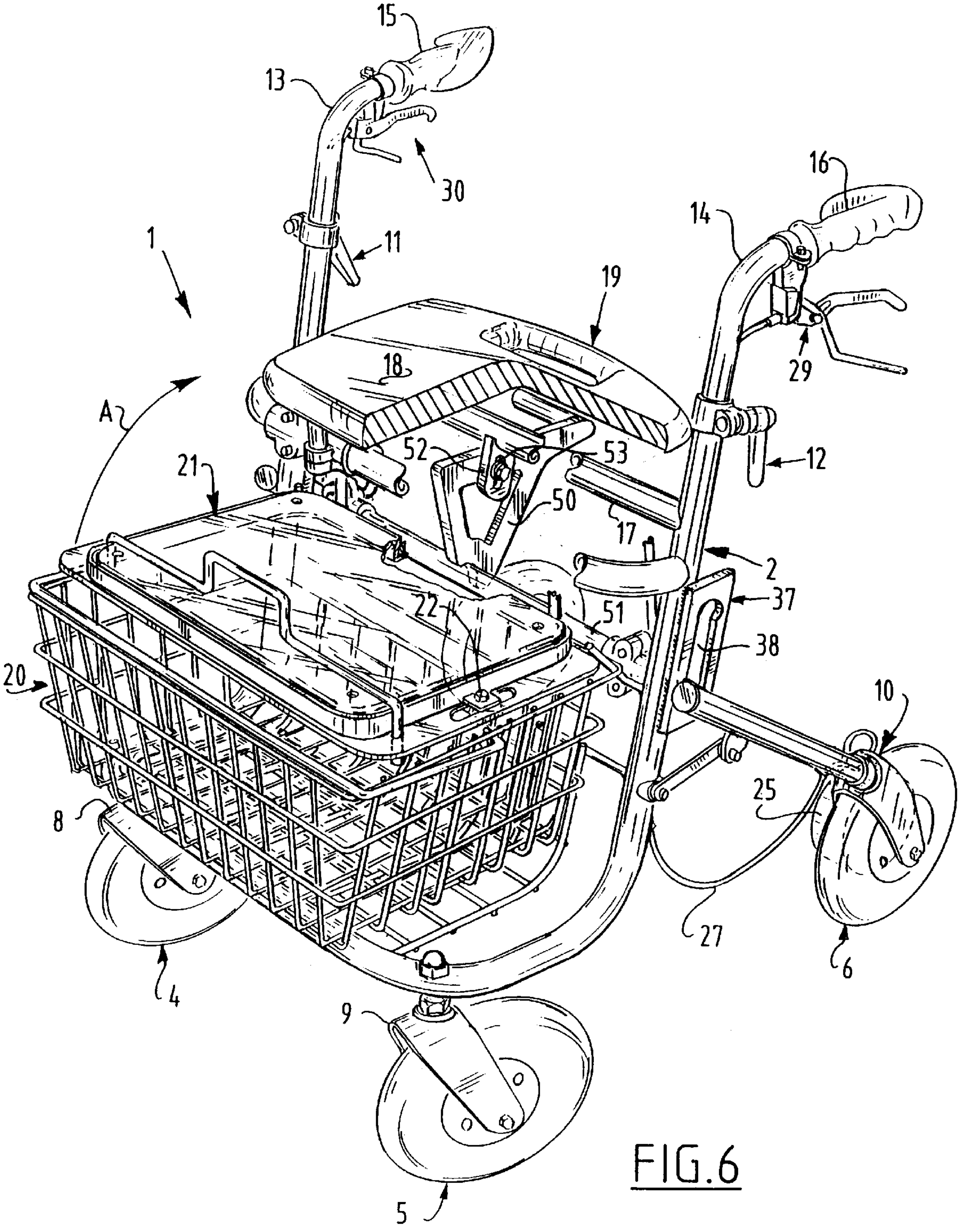
FIG. 6 shows a view in perspective of a further embodiment of a walking carriage, partially broken away.

In the further preferred embodiment of the walking carriage according to the present invention as shown in FIG. 6, the diverse components are designated with the same reference numerals. In this embodiment unintentional collapsing of the walking carriage by a user is prevented by means of a locking bracket 50 which extends in the locked position between bar 17 and bar 51 and which is formed such that it is snapped fixedly in the locked position and can also be easily snap released during collapsing of the walking carriage. Locking bracket 50 is preferably embodied in plastic and arranged on the frame using connecting element 52 which is provided with a clot 53, wherein bracket 50 is slightly height-adjustable in order to cause the bracket to clamp easily and in order to enable changing of the height adjustment in the case this bracket becomes worn.

Although the present invention is described in detail in the foregoing with reference to one embodiment thereof, the rights deriving from this patent application should not be deemed as being in any way limited thereby; the rights applied for are defined by the following claims.

I claim:

1. A walking carriage or ambulatory aid, comprising:
- a frame; at least one push bar at the frame for pushing the carriage, the push bar having an upper end;
- the frame having a lower support portion with a front and a rear, a pair of front wheels toward the front of the support portion;
- a pair of rear wheels to the rear of the support portion; a support for the rear wheels, the support being connected to the frame, the support being movable for moving the rear wheels toward and away from the front wheels;
- collapsing means for collapsing the carriage between a first use position in which the front and rear wheels are relatively more distant apart and the walking carriage can be pushed in use, and a second collapsed position in which the support for the rear wheels is moved so that the front and rear wheels are moved relatively closer to each other;
- a seat having a rear side directed rearwardly and an opposite front side, the seat being pivotable on the frame, the seat having a third use position, in which the seat is oriented for being sat upon and is at a level below the upper end of the push bar; the seat having a grip toward the rear thereof such that when the grip is drawn upward, it pivots the rear of the seat upward around the pivot for the seat, the seat being so connected with the collapsing means and with the support for the rear wheels as to move the support for the rear wheels to move the rear wheels toward the front wheels to collapse the carriage, and
- the carriage has a fully collapsed position with the seat fully pivoted up and the rear wheels furthest toward the front wheels, a fully open position with the seat in the third use position and the rear wheels at their greatest distance from the front wheel, and an intermediate position with the seat partly pivoted up and the rear wheels partly toward the front wheels.

2. The walking carriage of claim 1, further comprising a brake at at least one of the wheels, a brake operating member at the push bar, and a cable connection between the brake operating member and the brake for operating the brake.

3. The walking carriage of claim 1, further comprising a locking bracket shaped for engaging both the support for the rear wheels and the support portion for the front wheels when the collapsing means is in the first use position with the front and rear wheels apart, for preventing the collapsing means from collapsing to the second collapsed position, the locking bracket being removable to permit the collapsing.

4. The walking carriage of claim 2, wherein the brake comprises a drum brake at at least one wheel.

5. The walking carriage of claim 4, wherein the drum brake comprises a plastic drum and a brake shoe comprised of plastic.

6. The walking carriage of claim 5, further comprising a rough peripheral belt with a rough surface extending between the brake shoe and the brake drum.

7. The walking carriage of claim 6, wherein the belt is made of plastic.

8. A walking carriage or ambulatory aid, comprising:

a frame; at least one push bar at the frame for pushing the carriage, the push bar having an upper end;

the frame having a lower support portion with a front and a rear, a pair of front wheels toward the front of the support portion;

a pair of rear wheels to the rear of the support portion; a support for the rear wheels, the support being connected to the frame, the support being movable for moving the rear wheels toward and away from the front wheels;

collapsing means for collapsing the carriage between a first use position in which the front and rear wheels are relatively more distant apart and the walking carriage can be pushed in use, and a second collapsed position in which the support for the rear wheels is moved so that the front and rear wheels are moved relatively closer to each other;

a seat having a rear side directed rearwardly and an opposite front side, the seat being pivotable on the frame, the seat having a third use position, in which the seat is oriented for being sat upon and is at a level below the upper end of the push bar; the seat having a grip toward the rear thereof such that when the grip is drawn upward, it pivots the rear of the seat upward around the pivot for the seat, the seat being so connected with the collapsing means and with the support for the rear wheels as to move the support for the rear wheels to move the rear wheels toward the front wheels to collapse the carriage; and the support for the rear wheels comprises a respective post extending rearwardly from the frame and to each of the rear wheels, the linkage extending between the post and the frame;

the seat being connected to the support for the rear wheels such that when the rear of the seat is pivoted upward at the grip, the support and the linkage are moved so that the rear wheels are collapsed toward the front wheels;

a guide on the frame for guiding translation of the post along the guide; the post being pivotally connected with the guide for permitting pivoting of the post with respect to the guide, and the pivot connection between the post and the guide being translatable along the guide;

the rear region of the seat being connected with the post at the guide such that as the rear of the seat is raised, the post for the rear wheels is raised along the guide and also pivots with respect to the guide while the linkage between the post and frame swings the post and the supported rear wheels toward the front wheels while the carriage is being collapsed.

9. The walking carriage of claim 8, further comprising a locking bracket shaped for engaging the posts extending to each of the rear wheels and for engaging the support portion for the front wheels when the collapsing means is in the first use position with the front and rear wheels apart, for preventing the posts from translating along the guide and for thereby preventing collapse of the carriage and for preventing the collapsing means from collapsing to the second collapsed position, the locking bracket being removable to permit the collapsing.

10. The walking carriage of claim 9, further comprising a first bar across the carriage engaging the posts generally where they meet the translation guide and a second bar between the sides of the frame and the support portion and also above the first bar; the locking bracket engaging the first and second bars.

11. A walking carriage or ambulatory aid, comprising:

a frame; at least one push bar at the frame for pushing the carriage, the push bar having an upper end;

the frame having a lower support portion with a front and a rear, a pair of front wheels toward the front of the support portion;

a pair of rear wheels to the rear of the support portion; a support for the rear wheels, the support being connected to the frame, the support being movable for moving the rear wheels toward and away from the front wheels;

collapsing means for collapsing the carriage between a first use position in which the front and rear wheels are relatively more distant apart and the walking carriage can be pushed in use, and a second collapsed position in which the support for the rear wheels is moved so that the front and rear wheels are moved relatively closer to each other;

a seat having a rear side directed rearwardly and an opposite front side, the seat being pivotable on the frame, the seat having a third use position, in which the seat is oriented for being sat upon and is at a level below the upper end of the push bar; the seat having a grip toward the rear thereof such that when the grip is drawn upward, it pivots the rear of the seat upward around the pivot for the seat, the seat being so connected with the collapsing means and with the support for the rear wheels as to move the support for the rear wheels to move the rear wheels toward the front wheels to collapse the carriage, and a tray pivotally supported to the frame and pivotable between a first pivot position at which the tray is above and extends over the seat and a second position at which the tray is pivoted off the seat.

12. The walking carriage of claim 11, wherein the tray is pivotally supported to the frame below the seat.

13. The walking carriage of claim 11, further comprising article carrying means supported on the frame lower than the seat and in a position such that when the tray is pivoted off the seat, the tray is positioned to cover over the carrying means.

14. A walking carriage or ambulatory aid comprising:

a frame; at least one push bar at the frame for pushing the carriage, the push bar having an upper end;

a plurality of wheels attached to the frame for enabling travel of the carriage when the carriage is pushed;

a seat supported to the frame extending in a seating position which is at a lower level than the upper end of the push bar;

collapsing means connected with the frame for collapsing or folding up the frame or for opening up the frame;

a tray pivotally supported to the frame at a pivot location below the seat, and a support from the pivot location to the tray, such that the tray has a first pivot position where it extends above and over the seat and a second pivot position where the tray is off and below the seat.

15. The walking carriage of claim 14, further comprising article carrying means supported on the frame positioned so that when the tray is pivoted to the second position off the seat, the tray covers the carrier.

16. The walking carriage of claim 14, further comprising a brake at at least one of the wheels, a brake operating member at the push bar and a cable connection between the brake operating member and the brake for operating the brake.

* * * * *